UNITED STATES PATENT OFFICE.

HERMANN SCHOEMBS, OF OFFENBACH-ON-THE-MAIN, GERMANY

PRODUCING LITHOGRAPHIC SURFACES.

SPECIFICATION forming part of Letters Patent No. 379,731, dated March 20, 1888.

Application filed August 11, 1887. Serial No. 246,675. (No specimens.) Patented in France February 10, 1887, No. 181,470.

*To all whom it may concern:*

Be it known that I, HERMANN SCHOEMBS, a subject of the Emperor of Germany, resident at Offenbach-on-the-Main, Germany, have invented new and useful Improvements in Lithographic Printing-Plates, (for which I have received Letters Patent in France, dated February 10, 1887, and numbered 181,470,) of which the following is a specification.

The invention consists of a process for producing zincographic plates, consisting in subjecting the zinc plates to the action of a mixture of nitric and sulphuric acids and then to the action of an ammonia salt.

In order to produce the zincographic plates, I place for a short time the mechanically cleaned or grained zinc plates in a bath consisting of a mixture of nitric and sulphuric acids. The surface of the zinc is rendered finely crystalline or porous by the solvent action of the sulphuric acid, thus rendering the plate more suitable for the reception of the color. The nitric acid oxidizes the nascent hydrogen, whereby a more uniform action of the sulphuric acid is obtained. The plates thus prepared are then removed from the bath and cleaned by rinsing them off with water, so that the adhering acid and the carbon separated by the action of the acid are removed. The plates are then rinsed with a dilute solution of ammonia salt, (other than ammonia sulphide,) preferably ammonium chloride, and then the plates are dried.

The plates are to be washed off with clean water just before being used, in order to dissolve the double salt formed.

The ammonia salt effects the conversion of the basic zinc carbonate, formed by the action of the atmosphere upon the moist zinc plate, into a readily-soluble salt of zinc and ammonium, which is easily dissolved by washing the plate, as directed, with clean water, thus laying bare the porous pure metallic zinc surface to receive the printing-color in the usual manner. The plates are then used in the same way as the ordinary lithographic stones now in use.

Having thus fully described my invention, I claim as new and desire to secure by Letters Patent—

The herein-described process of producing lithographic printing-plates, consisting in subjecting the zinc plates to the action of a mixture of nitric and sulphuric acids and then subjecting said plates to the action of an ammonia salt, as set forth.

In testimony whereof I have signed my name to this specification in the presence of two subscribing witnesses.

HERMANN SCHOEMBS.

Witnesses:
 FRANZ HASSLACHER,
 JOSEPH PATRICK.